(12) United States Patent
Wei et al.

(10) Patent No.: US 8,937,589 B2
(45) Date of Patent: Jan. 20, 2015

(54) GESTURE CONTROL METHOD AND GESTURE CONTROL DEVICE

(75) Inventors: Shou-Te Wei, New Taipei (TW);
Chia-Te Chou, New Taipei (TW);
Hsun-Chih Tsao, New Taipei (TW);
Chih-Pin Liao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 379 days.

(21) Appl. No.: 13/603,432

(22) Filed: Sep. 5, 2012

(65) Prior Publication Data

US 2013/0278493 A1 Oct. 24, 2013

(30) Foreign Application Priority Data

Apr. 24, 2012 (TW) .............................. 101114499 A

(51) Int. Cl.
*G09G 5/00* (2006.01)
(52) U.S. Cl.
USPC ............................ 345/156; 382/103; 715/863
(58) Field of Classification Search
USPC .......................... 345/156–159; 382/103, 106; 348/207.99, 222.1, 262; 715/764, 781, 715/863
See application file for complete search history.

(56) References Cited

U.S. PATENT DOCUMENTS

| | | | | |
|---|---|---|---|---|
| 8,068,095 B2* | 11/2011 | Pryor | | 345/157 |
| 8,643,598 B2* | 2/2014 | Tsurumi et al. | | 345/158 |
| 2004/0190776 A1* | 9/2004 | Higaki et al. | | 382/190 |
| 2009/0027337 A1* | 1/2009 | Hildreth | | 345/158 |
| 2009/0167882 A1 | 7/2009 | Chen | | |
| 2009/0228841 A1* | 9/2009 | Hildreth | | 715/863 |
| 2009/0262187 A1* | 10/2009 | Asada et al. | | 348/77 |
| 2011/0001813 A1* | 1/2011 | Kim et al. | | 348/77 |
| 2011/0057875 A1* | 3/2011 | Shigeta et al. | | 345/156 |
| 2011/0158476 A1* | 6/2011 | Fahn et al. | | 382/103 |
| 2012/0268372 A1* | 10/2012 | Park et al. | | 345/158 |
| 2012/0275648 A1* | 11/2012 | Guan | | 382/103 |
| 2012/0304067 A1* | 11/2012 | Han et al. | | 715/728 |
| 2013/0201105 A1* | 8/2013 | Ptucha et al. | | 345/158 |
| 2014/0037134 A1* | 2/2014 | Tong et al. | | 382/103 |
| 2014/0104161 A1* | 4/2014 | Liao et al. | | 345/156 |

FOREIGN PATENT DOCUMENTS

TW 200928892 7/2009

OTHER PUBLICATIONS

Office action mailed on Apr. 4, 2014 for the Taiwan application No. 101114499, filing date: Apr. 24, 2012, p. 1-5 and p. 6 line 1-15.

* cited by examiner

*Primary Examiner* — Joe H Cheng
(74) *Attorney, Agent, or Firm* — Winston Hsu; Scott Margo

(57) ABSTRACT

A gesture control method includes steps of capturing at least one image; detecting whether there is a face in the at least one image; if there is a face in the at least one image, detecting whether there is a hand in the at least one image; if there is a hand in the at least one image, identifying a gesture performed by the hand and identifying a relative distance or a relative moving speed between the hand and the face; and executing a predetermined function in a display screen according to the gesture and the relative distance or according to the gesture and the relative moving speed.

36 Claims, 10 Drawing Sheets

GESTURE CONTROL METHOD AND GESTURE CONTROL DEVICE

BACKGROUND OF THE INVENTION

1. Field of the Invention

The invention relates to a gesture control method and a gesture control device and, more particularly, to a gesture control method and a gesture control device using a relation between a face and a hand to execute a corresponding function.

2. Description of the Prior Art

So far a user usually operates an electronic device by an input device, such as keyboard, mouse, touch panel, remote controller, and soon. However, since the user has to hold or touch those input devices including keyboard, mouse, touch panel, remote controller, and so on for operation, it is inconvenient for the user. As motion control gets more and more popular, the present operation behavior of user may change in the future, wherein gesture control may be adapted for various applications. In the prior art, the gesture control technology can be classified into three types in the following. The first type is to put special properties on the user and the shortcoming of the first type is that it is inconvenient in use. The second type is to use a 2D image sensor to detect motion of the user and the shortcoming of the second type is that it is not precise enough in detection. The third type is to use a 3D image sensor to detect motion of the user and the shortcoming of the third type is that the cost is high, the mechanism is heavy, and it cannot be installed in all kinds of electronic devices.

SUMMARY OF THE INVENTION

The invention provides a gesture control method and a gesture control device using a relation between a face and a hand to execute a corresponding function, so as to solve the aforesaid problems.

According to an embodiment of the invention, a gesture control method comprises steps of capturing at least one image; detecting whether there is a face in the at least one image; if there is a face in the at least one image, detecting whether there is a hand in the at least one image; if there is a hand in the at least one image, identifying a gesture performed by the hand and identifying a relative distance or a relative moving speed between the hand and the face; and executing a predetermined function in a display screen according to the gesture and the relative distance or according to the gesture and the relative moving speed.

According to another embodiment of the invention, a gesture control device comprises a display unit, an image capturing unit and a processing unit, wherein the processing unit is electrically connected to the image capturing unit and the display unit. The display unit is used for displaying a display screen. The image capturing unit is used for capturing at least one image. The processing unit detects whether there is a face in the at least one image. If there is a face in the at least one image, the processing unit detects whether there is a hand in the at least one image. If there is a hand in the at least one image, the processing unit identifies a gesture performed by the hand and identifies a relative distance or a relative moving speed between the hand and the face. Then, the processing unit executes a predetermined function in the display screen according to the gesture and the relative distance or according to the gesture and the relative moving speed.

As mentioned in the above, the invention detects the face of the user after capturing image (s) of the user so as to obtain a position of the user, detects the hand of the user, and then identifies the gesture performed by the hand and the relative distance or the relative moving speed between the hand and the face, so as to execute the predetermined function (e.g. turn photo, channel, song, movie, volume, etc. or select specific file, program, etc.) in the display screen according to the gesture and the relative distance or according to the gesture and the relative moving speed. The invention can use a 2D image sensor to detect the face and the hand of the user and then uses the relation between the face and the hand to execute corresponding function, so as to achieve great precision similar to a 3D image sensor. Therefore, the invention is very convenient in use, has low cost, and can be installed in all kinds of electronic devices (e.g. All-in-One PC, Smart TV, Notebook PC, etc.) due to small size mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
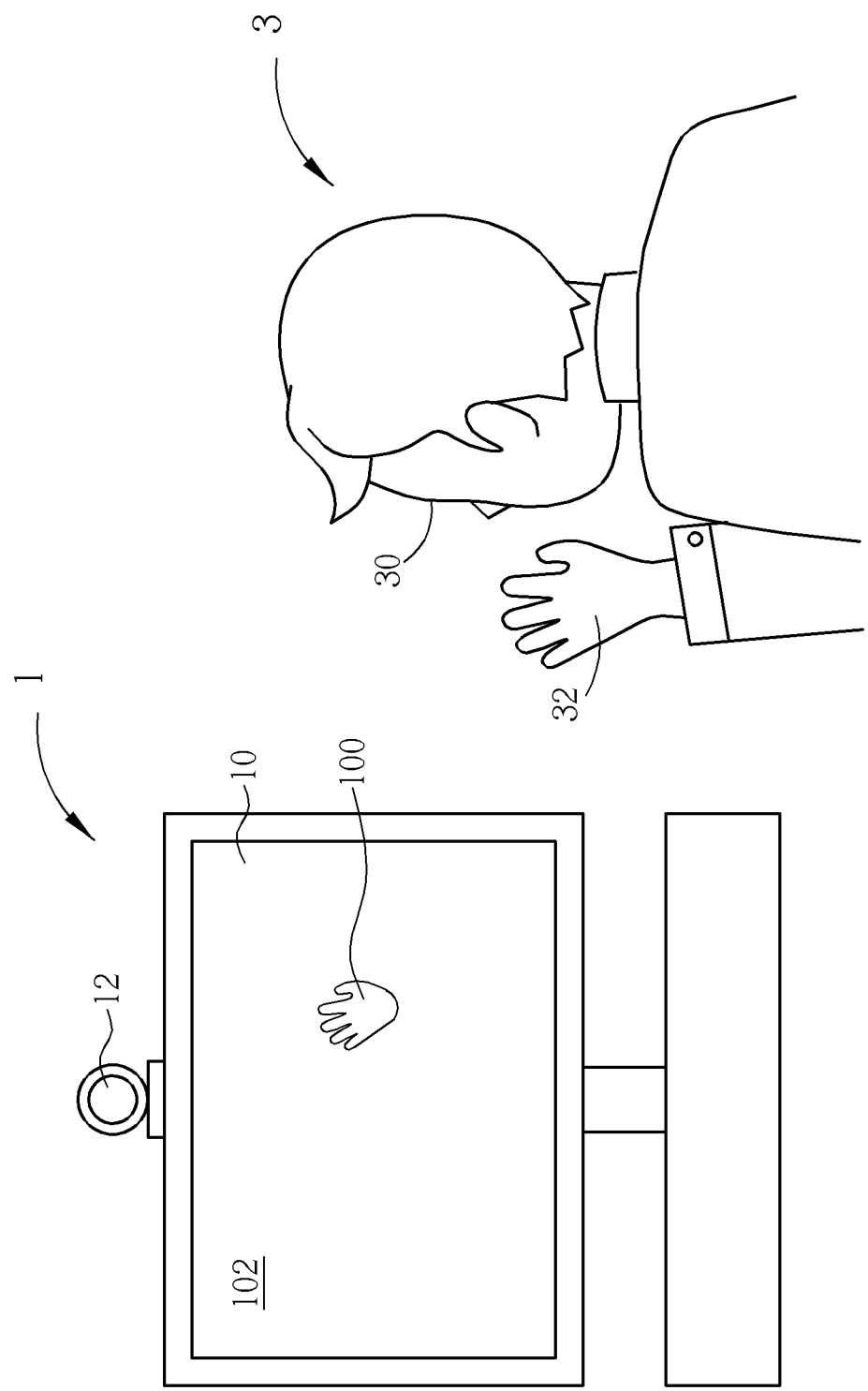
FIG. 1 is a schematic diagram illustrating a gesture control device according to an embodiment of the invention.
Figure 2:
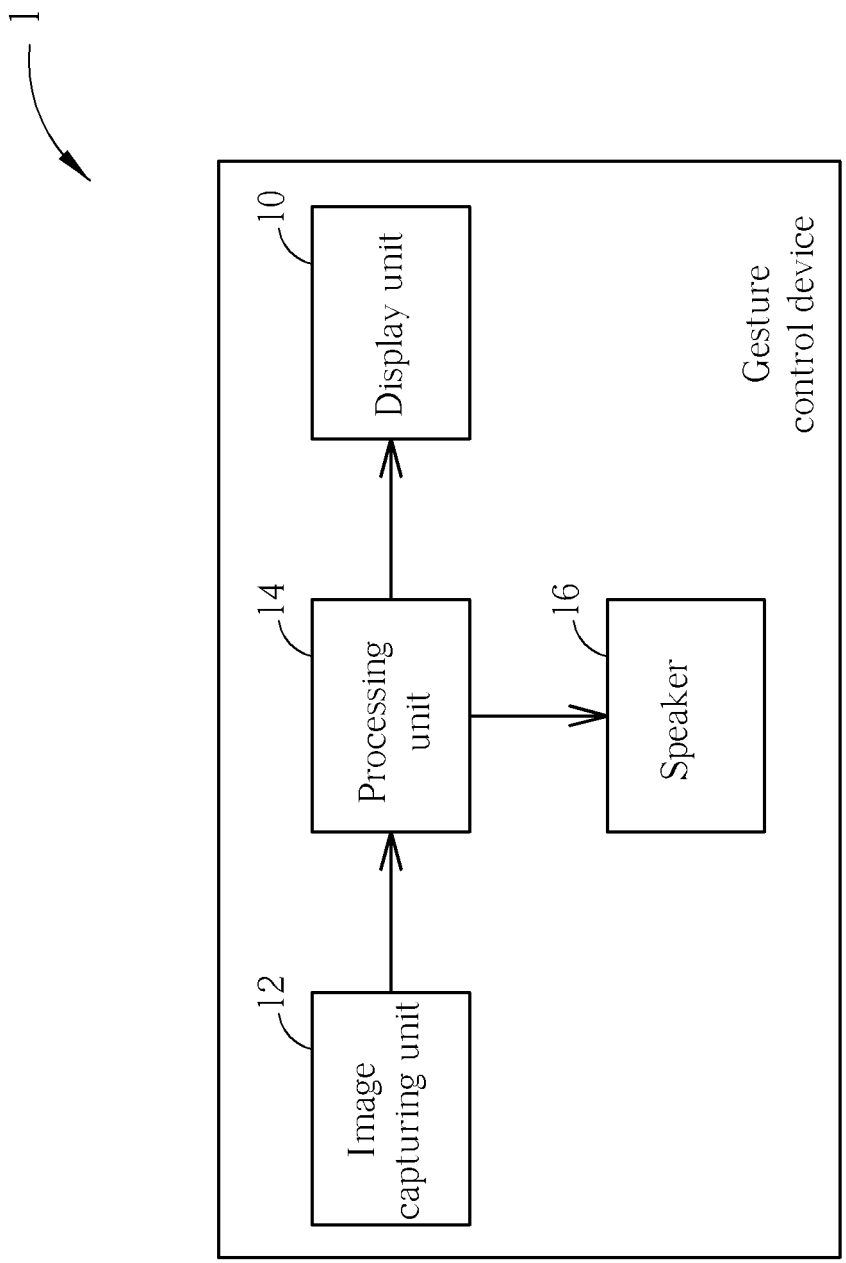
FIG. 2 is a functional block diagram illustrating the gesture control device shown in FIG. 1.

Referring to FIGS. 1 and 2, FIG. 1 is a schematic diagram illustrating a gesture control device 1 according to an embodiment of the invention, and FIG. 2 is a functional block diagram illustrating the gesture control device 1 shown in FIG. 1. The gesture control device 1 of the invention may be any electronic devices with data processing function, such as All-in-One PC, Smart TV, Notebook PC, etc. As shown in FIGS. 1 and 2, the gesture control device 1 comprises a display unit 10, an image capturing unit 12, a processing unit 14 and a speaker 16, wherein the display unit 10, the image capturing unit 12 and the speaker 16 are electrically connected to the processing unit 14. A user 3 can use his/her hand 32 to perform a gesture in front of the image capturing unit 12 and then the processing unit 14 of the gesture control device 1 identifies image(s) captured by the image capturing unit 12, so as to control a gesture corresponding object 100 (e.g.

cursor) or other user interfaces to execute corresponding function within a display screen 102 displayed by the display unit 10.

In practical applications, the display unit 10 may be a liquid crystal display device, other display devices or a projection screen, the image capturing unit 12 may be, but not limited to, a charge-coupled device (CCD) sensor or a complementary metal-oxide semiconductor (CMOS) sensor, and the processing unit 14 may be a processor or a controller with data calculating/processing function. In general, the gesture control device 1 may be further equipped with some necessary hardware or software components for specific purposes, such as a memory, a storage device, a power supply, an operating system, etc., and it depends on practical applications.

Figure 3:
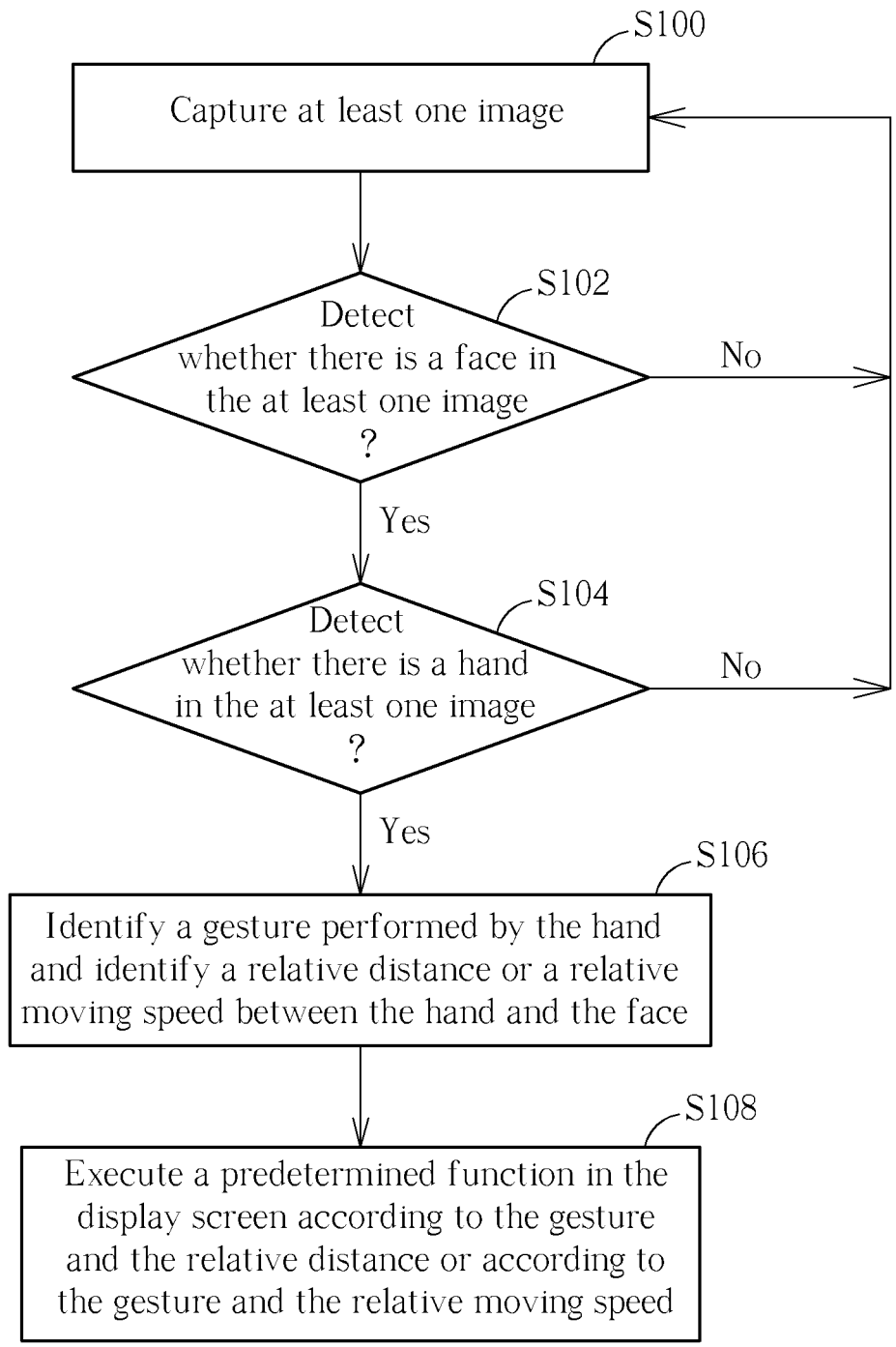
FIG. 3 is a flowchart illustrating a gesture control method according to an embodiment of the invention.

Referring to FIG. 3, FIG. 3 is a flowchart illustrating a gesture control method according to an embodiment of the invention. The gesture control method shown in FIG. 3 is adapted to the aforesaid gesture control device 1. When the user 3 is located in front of the image capturing unit 12, the image capturing unit 12 captures at least one image in step S100. Afterward, the processing unit 14 detects whether there is a face 30 of the user 3 in the at least one image in step S102. If there is a face 30 of the user 3 in the at least one image, the processing unit 14 detects whether there is a hand 32 of the user 3 in the at least one image in step S104. If the face 30 of the user 3 is not in the at least one image, go back to the step S100. If there is a hand 32 of the user 3 in the at least one image, the processing unit 14 identifies a gesture performed by the hand 32 of the user 3 and identifies a relative position, a relative distance or a relative moving speed between the hand 32 and the face 30 in step S106. If the hand 32 of the user 3 is not in the at least one image, go back to the step S100. Finally, the processing unit 14 executes a predetermined function in the display screen 100 displayed by the display unit 10 according to the gesture, the relative position, the relative distance and/or the relative moving speed in step S108.

When the processing unit 14 detects the hand 32 of the user 3, the processing unit 14 may display the gesture corresponding object 100 in the display screen 102. As shown in FIG. 1, the gesture corresponding object 100 may be, but not limited to, a palm shape corresponding to the hand 32 of the user 3. In another embodiment, the gesture corresponding object 100 may be a common cursor or a light stick. Furthermore, when the processing unit 14 detects the hand 32 of the user 3, the processing unit 14 may control the speaker 16 to broadcast a sound so as to notify the user 3 that he or she can start to perform a gesture by the hand 32 to control the gesture corresponding object 100 or other user interfaces to execute corresponding function within the display screen 102 displayed by the display unit 10.

The features of the invention will be depicted in the following by several embodiments using the gesture control device 1 shown in FIGS. 1 and 2 and the gesture control method shown in FIG. 3.

Figure 4:
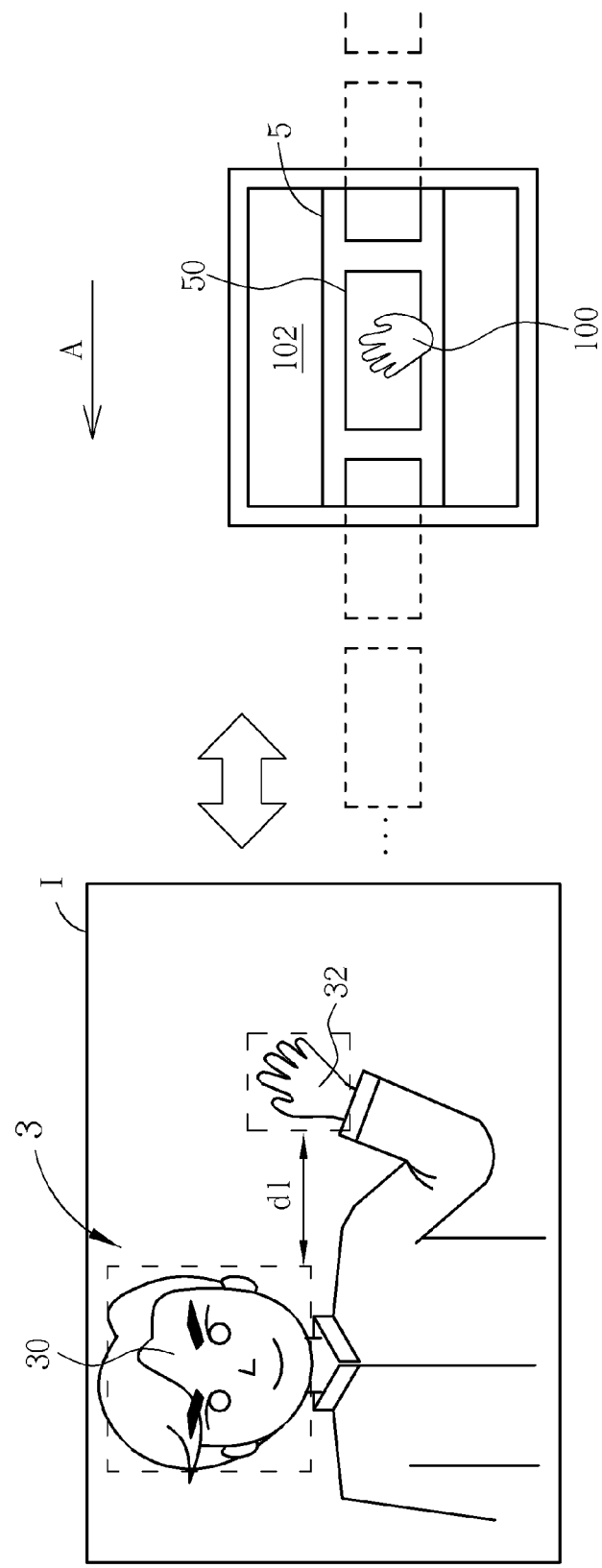
FIG. 4 is a schematic diagram illustrating the user moving a palm of the hand to a distance from the face so as to execute a turning function.
Figure 5:
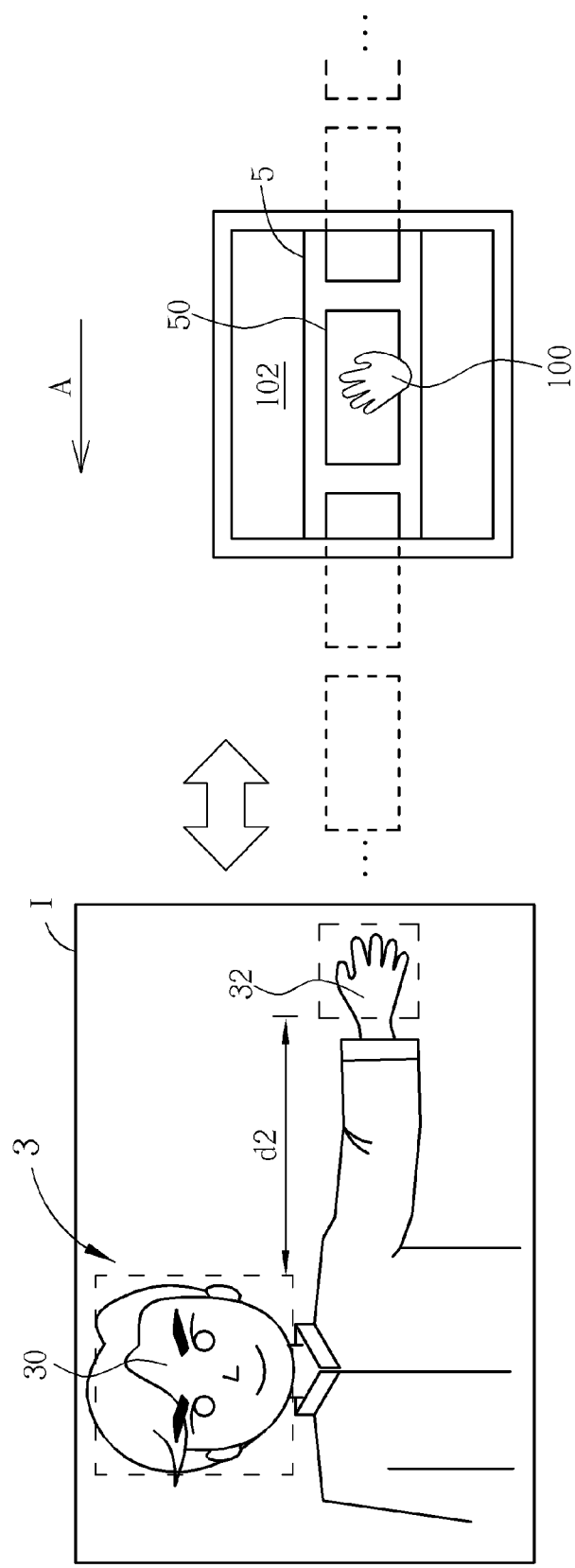
FIG. 5 is a schematic diagram illustrating the user moving a palm of the hand to another distance from the face so as to execute a turning function.
Figure 6:
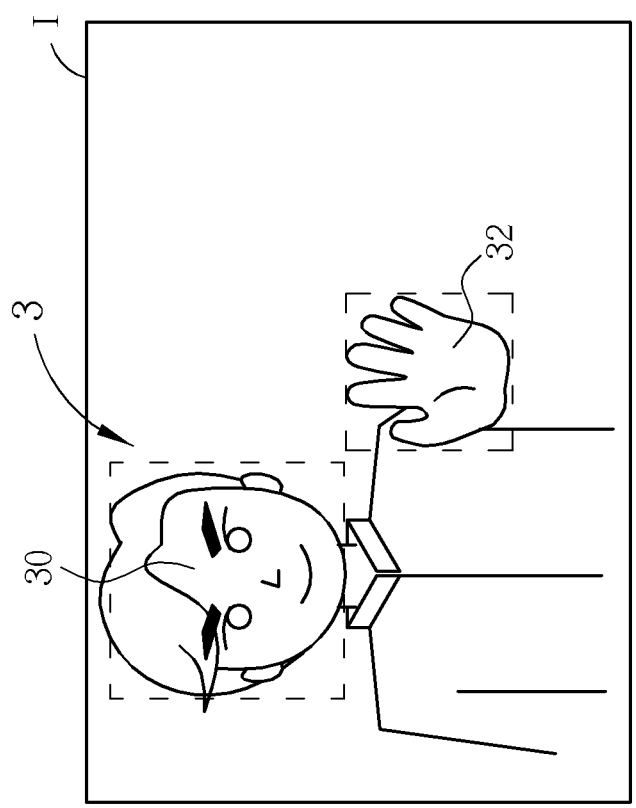
FIG. 6 is a schematic diagram illustrating the user moving a palm of the hand forward so as to execute a selecting function.

Referring to a first embodiment shown in FIGS. 4 to 6, FIG. 4 is a schematic diagram illustrating the user 3 moving a palm of the hand 32 to a distance d1 from the face 30 so as to execute a turning function, FIG. 5 is a schematic diagram illustrating the user 3 moving a palm of the hand 32 to a distance d2 from the face 30 so as to execute a turning function, and FIG. 6 is a schematic diagram illustrating the user 3 moving a palm of the hand 32 forward so as to execute a selecting function. When the user 3 wants to use the hand 32 to perform a gesture to control the gesture control device 1 to execute a turning function, the user 3 has to enter an image capturing range of the image capturing unit 12 first. At this time, the image capturing unit 12 captures an image I of the user 3, as shown in FIG. 4. Afterward, after detecting the face 30 and the hand 32 of the user 3 in the image I at the same time, the processing unit 14 displays the gesture corresponding object 100 in the display screen 102 and controls the speaker 16 to broadcast a sound so as to notify the user 3 that he or she can start to perform a gesture by the hand 32. At this time, the user 3 can move the palm of the hand 32 to a specific distance from the face 30 so as to execute a turning function (i.e. the aforesaid predetermined function).

As shown in FIG. 4, when the user 3 moves the palm of the hand 32 to a distance d1 from the face 30, the processing unit 14 controls an object 50 of an object list 5 in the display screen 102 to turn toward a direction of an arrow A in a turning speed corresponding to the distance d1. As shown in FIG. 5, when the user 3 moves the palm of the hand 32 to another distance d2 from the face 30, the processing unit 14 controls the object 50 of the object list 5 in the display screen 102 to turn toward the direction of the arrow A in another turning speed corresponding to the distance d2. In this embodiment, the distance between the palm of the hand 32 and the face 30 is proportional to the turning speed of the turning function. Since the distance d2 is larger than the distance d1, the turning speed of the object 50 shown in FIG. 5 is larger than the turning speed of the object 50 shown in FIG. 4. In other words, if the user 3 wants to raise the turning speed, he or she can move the palm of the hand 32 away from the face 30 so as to increase the distance between the palm of the hand 32 and the face 30. On the other hand, if the user 3 wants to slow down the turning speed, he or she can move the palm of the hand 32 toward the face 30 so as to decrease the distance between the palm of the hand 32 and the face 30. Furthermore, the user 3 can use the other hand to control the object 50 of the object list 5 in the display screen 102 to turn toward the reversed direction of the arrow A according to the aforesaid operation manner. That is to say, the processor 14 will determine that the hand 32 is located at left or right side of the face 30 first so as to determine a turning direction (e.g. leftward or rightward) of the object list 5 in the display screen 102 correspondingly and then determines the distance between the palm of the hand 32 and the face 30 so as to determine the turning speed correspondingly.

In a second embodiment, the invention may set the distance d1 shown in FIG. 4 and the distance d2 shown in FIG. 5 to be two thresholds, which form three distance intervals, for adjusting the turning speed. For example, when the distance between the palm of the hand 32 and the face 30 is smaller than the distance d1 shown in FIG. 4 (i.e. the palm of the hand 32 is located in a distance interval close to the face 30), the object 50 in the display screen 102 will be turned in a predetermined slow speed (e.g. 2× speed); when the distance between the palm of the hand 32 and the face 30 is between the distance d1 shown in FIG. 4 and the distance d2 shown in FIG. 5 (i.e. the palm of the hand 32 is located in a middle distance interval), the object 50 in the display screen 102 will be turned in a predetermined middle speed (e.g. 4× speed); and when the distance between the palm of the hand 32 and the face 30 is larger than the distance d2 shown in FIG. 5 (i.e. the palm of the hand 32 is located in a distance interval far away from the face 30), the object 50 in the display screen 102 will be turned in a predetermined fast speed (e.g. 8× speed). It should be noted that the number and value of thresholds for adjusting the turning speed and the corresponding value of the turning speed are not limited to the aforesaid embodiment and can be determined based on practical applications. Moreover, the object list 5 may be a photo list, channel list, song list, movie list, contact list, document list or other lists and the object 50 may be a photo, channel, song, movie, contact person, document or other objects correspondingly. In another embodiment, the object list 5 may be also a volume adjusting interface, brightness adjusting interface or other software/hardware setting adjusting interfaces for the user 3 to adjust the setting according to the aforesaid operation manner. In this embodiment, it is reasonably expected that the processing unit 14 may also determine that the palm of the hand 32 is located at left or right side of the face 30 first so as to determine the object list 5 in the display screen 102 should turn leftward or rightward (or turn forward or backward) correspondingly and then determines the distance between the palm of the hand 32 and the face 30 or compares the distance with the thresholds so as to determine the turning speed correspondingly.

When the user 3 turns the object list 5 to find the desired object 50, the user 3 can move the palm of the hand 32 forward, as shown in FIG. 6. At this time, the processing unit 14 will detect that the size of the palm of the hand 32 in the image I captured by the image capturing unit 12 increases and determine that the user 3 wants to execute the selecting function (i.e. the aforesaid predetermined function). Afterward, the processing unit 14 will select and play the object 50 or open and execute the object 50 in the display screen 102. In another embodiment, the user 3 may also move the palm of the hand 32 forward and backward (i.e. the size of the palm of the hand 32 will increase first and then decrease) to execute the aforesaid selecting function. At this time, the processing unit 14 will detect that the size of the palm of the hand 32 in the image I captured by the image capturing unit 12 increases first and then decreases so as to determine that the user 3 wants to execute the selecting function.

Figure 7:
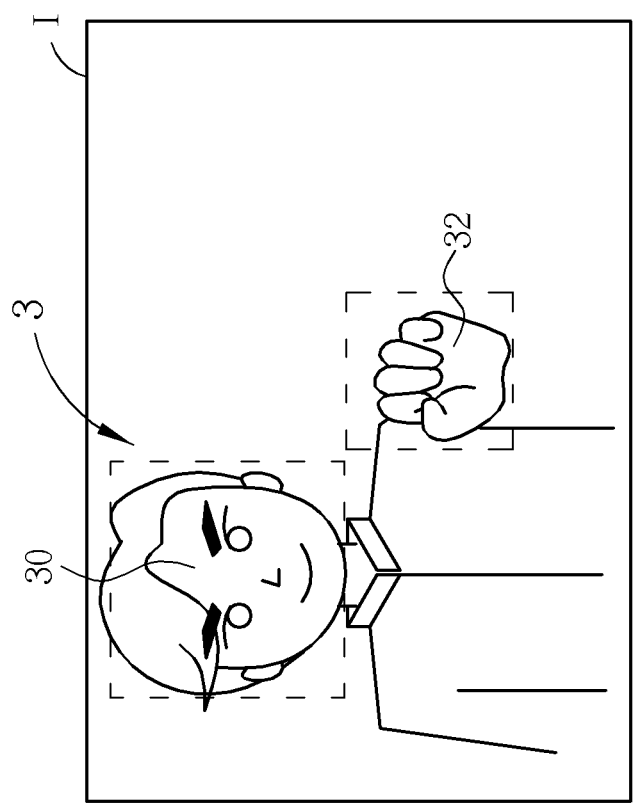
FIG. 7 is a schematic diagram illustrating the user moving a first of the hand forward so as to execute a selecting function.

Referring to FIG. 7, FIG. 7 is a schematic diagram illustrating the user 3 moving a first of the hand 32 forward so as to execute a selecting function. As shown in FIG. 7, the user 3 may also close the hand 32 to be a first and move the first forward so as to execute the aforesaid selecting function. Accordingly, the processing unit 14 will detect that the size of the first of the hand 32 in the image I captured by the image capturing unit 12 increases so as to determine that the user 3 wants to execute the selecting function. In another embodiment, the user 3 may also move the first of the hand 32 forward and backward to execute the aforesaid selecting function. Accordingly, the processing unit 14 will detect that the size of the first of the hand 32 in the image I captured by the image capturing unit 12 increases first and then decreases so as to determine that the user 3 wants to execute the selecting function.

Figure 8:
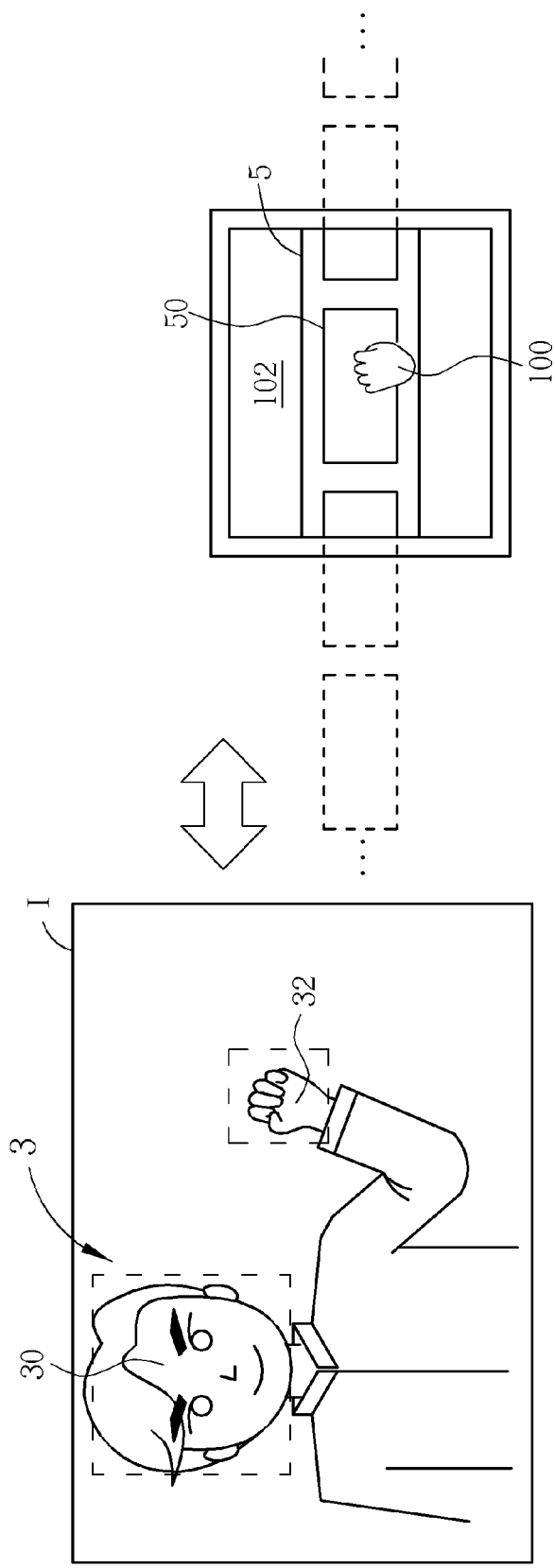
FIG. 8 is a schematic diagram illustrating the user using the first of the hand to lock an object in the display screen.
Figure 9:
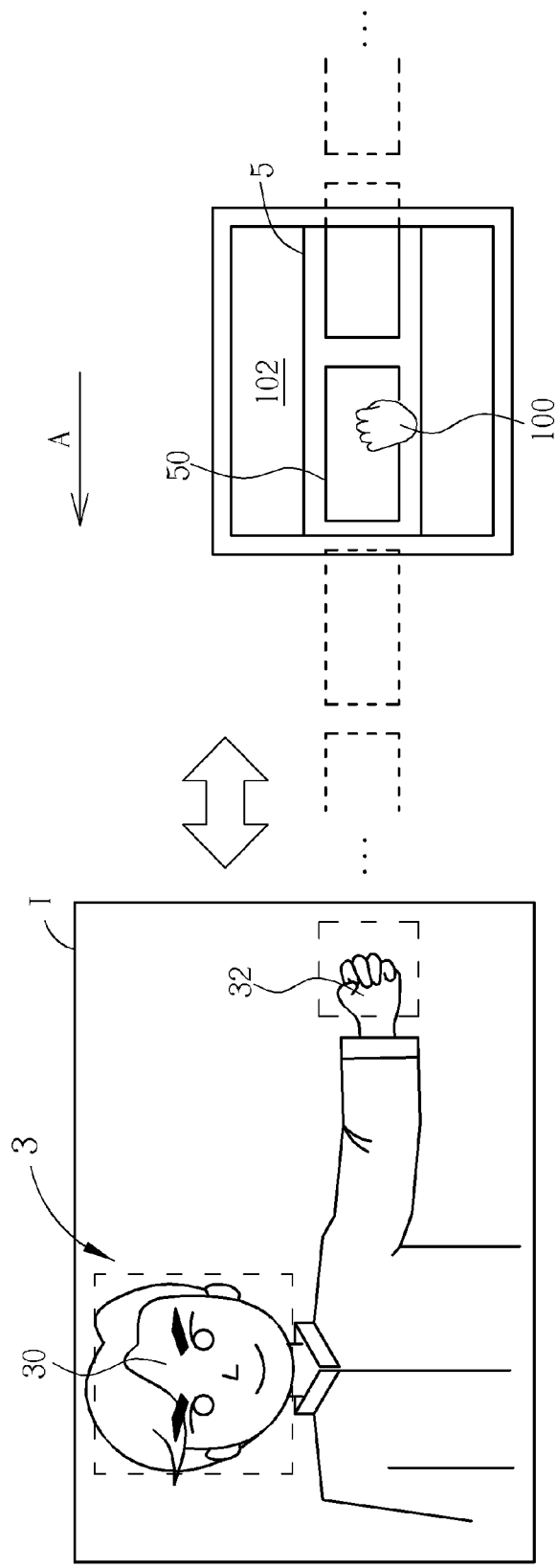
FIG. 9 is schematic diagram illustrating the user waving the first of the hand so as to execute the turning function.

Referring to a third embodiment shown in FIGS. 8 and 9, FIG. 8 is a schematic diagram illustrating the user 3 using the first of the hand 32 to lock an object 50 in the display screen 102, and FIG. 9 is schematic diagram illustrating the user 3 waving the first of the hand 32 so as to execute the turning function. After the processing unit 14 detects the face 30 and the hand 32 of the user 3 in the image I, the user 3 can wave the palm or the first of the hand 32 to execute the turning function under normal mode as the first embodiment and the second embodiment shown in FIGS. 4 and 5. However, as shown in FIG. 8, when the hand 32 of the user 3 changes from a palm to a fist, such as a grabbing motion, the gesture corresponding object 100 will change from a palm shape to a first shape correspondingly and the processing unit 14 will lock a certain object 50 of the object list 5 in the display screen 102. As shown in FIG. 9, when the user 3 keeps and waves the first of the hand 32, the processing unit 14 will control the object 50 to turn in a waving direction of the first of the hand 32 (as a direction of the arrow A). In this embodiment, the operation principle of using the gesture corresponding to object 100 with the first shape to turn the object 50 is similar to that of using a finger to touch and draw a touch display of a phone to execute turning function. That is to say, the wave of the first of the hand 32 is similar to flip the object 50. A waving speed of the first of the hand 32 is identical to a turning speed of the turning function. In other words, the faster the waving speed is, the faster the turning speed is; the slower the waving speed is, the slower the turning speed is. The user 3 may further wave the first of the hand 32 toward the reversed direction of the arrow A so as to control the object 50 to turn toward the reversed direction of the arrow A and the operation will not be depicted herein again. It should be noted that when the user 3 waves the first of the hand 32 till the object 50 is turned out of the display screen 102 or waves the first of the hand 32 with a distance and then opens the hand 32, the turning speed of the object 50 will slow down and then stop, such as a friction damping effect, if there is no further gesture performed. When the user 3 turns the object list 5 to find the desired object 50, the user 3 can move the first of the hand 32 forward or move the first of the hand 32 forward and backward so as to select the desired file, program, and so on according to the aforesaid embodiments and the operation will not be depicted herein again. Moreover, the aforesaid turning function can be also used for turning a time line when playing a movie (e.g. quick turn, rewind, etc.).

Figure 10:
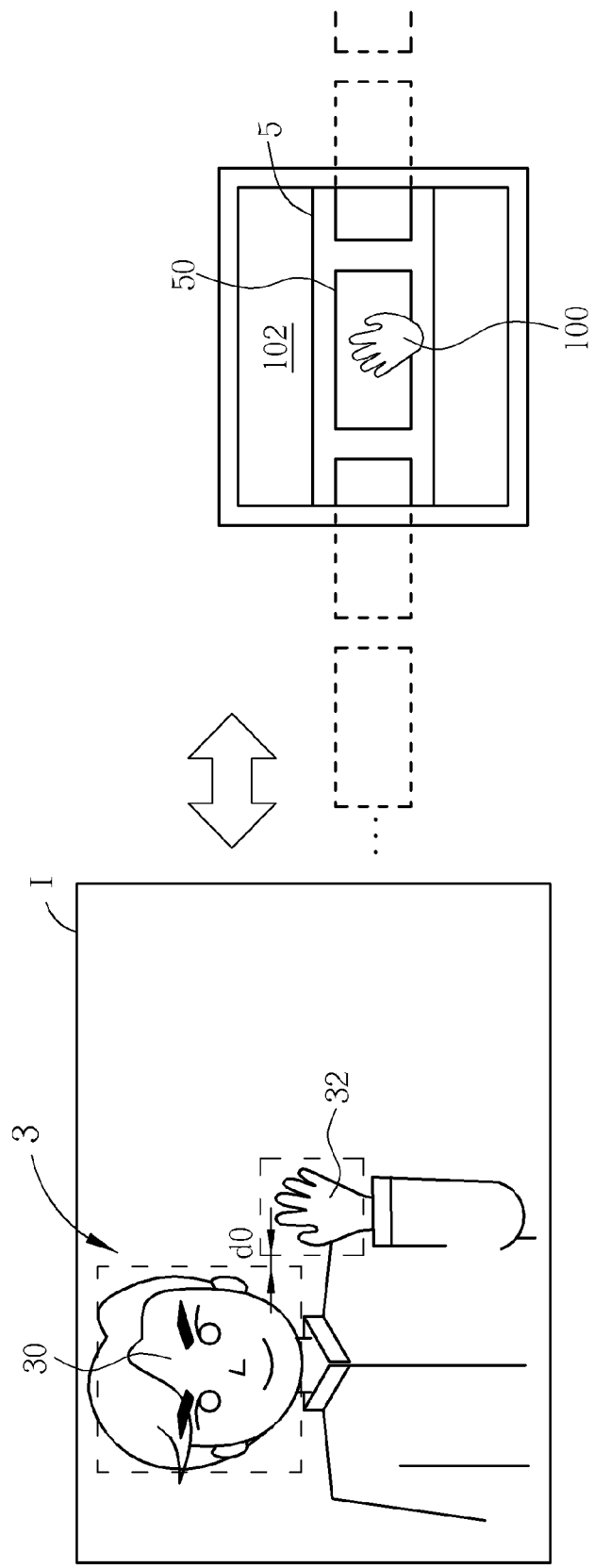
FIG. 10 is a schematic diagram illustrating the user performing a gesture to set an initial reference position.

Referring to a fourth embodiment shown in FIG. 10, FIG. 10 is a schematic diagram illustrating the user 3 performing a gesture to set an initial reference position. After the processing unit 14 detects the face 30 and the hand 32 of the user 3 in the image I, the user 3 can keep the palm of the hand 32 at an initial distance d0 from the face 30 motionless within a time period (e.g. three seconds, five seconds, etc.) and then the processing unit 14 will set an initial reference position according to the initial distance d0 (i.e. the aforesaid predetermined function). The initial reference position represents a position of the palm of the hand 32 with respect to the face 30 in the beginning. Then, the user 3 can wave the palm or the first of the hand 32 to execute the turning function. When the user 3 wave the palm or the first of the hand 32, the processing unit 14 will calculate a distance moved by the palm or the first of the hand 32 within a time period to generate a waving speed correspondingly according to the aforesaid initial reference position and then controls the object 50 in the display screen 102 to turn in the waving direction of the palm or the first of the hand 32 in the waving speed. In this embodiment, the waving speed of the palm or the first of the hand 32 is proportional to a turning speed of the turning function. In other words, the faster the waving speed is, the faster the turning speed is; the slower the waving speed is, the slower the turning speed is. It should be noted that, the same as the aforesaid embodiment, when the user 3 waves the palm or the first of the hand 32 till the object 50 is turned out of the display screen 102 or waves the first of the hand 32 with a distance and then opens the hand 32, the turning speed of the object 50 will slow down and then stop, such as a friction damping effect. When the user 3 turns the object list 5 to find the desired object 50, the user 3 can move the palm or the first of the hand 32 forward or move the palm or the first of the hand 32 forward and backward so as to select the desired file, program, and so on according to the aforesaid embodiments and the operation will not be depicted herein again. Furthermore, in this embodiment, the processing unit 14 will not execute any functions when a distance between the hand 32 and the face 30 of the user 3 is smaller than the initial distance d0.

In another embodiment, the user 3 can also keep the palm of the hand 32 at an initial distance d0 from the face 30 and wave the palm within a time period (e.g. three seconds, five seconds, etc.) and then the processing unit 14 will set the aforesaid initial reference position according to the initial distance d0. In another embodiment, the user 3 can also keep the palm of the hand 32 at an initial distance d0 from the face 30, close the hand 32 within a time period (e.g. three seconds, five seconds, etc.) and then opens the hand 32 and then the processing unit 14 will set the aforesaid initial reference position according to the initial distance d0. It should be noted that the user 3 can reset the initial reference position according to the aforesaid operation manners any time when using the gesture control device 1.

As mentioned in the above, the invention detects the face of the user after capturing image (s) of the user so as to obtain a position of the user, detects the hand of the user, and then identifies the gesture performed by the hand and the relative position, the relative distance or the relative moving speed between the hand and the face, so as to execute the predetermined function (e.g. turn photo, channel, song, movie, volume, etc. or select specific file, program, etc.) in the display screen according to the gesture and the relative position, the relative distance or the relative moving speed. The invention can use a 2D image sensor to detect the face and the hand of the user and then uses the relation between the face and the hand to execute corresponding function, so as to achieve great precision similar to a 3D image sensor. Therefore, the invention is very convenient in use, has low cost, and can be installed in all kinds of electronic devices (e.g. All-in-One PC, Smart TV, Notebook PC, etc.) due to small size mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture control method comprising:
capturing at least one image;
detecting whether there is a face in the at least one image;
if there is a face in the at least one image, detecting whether there is a hand in the at least one image;
if there is a hand in the at least one image, identifying a gesture performed by the hand and identifying a relative distance or a relative moving speed between the hand and the face; and
executing a predetermined function in a display screen according to the gesture and the relative distance or according to the gesture and the relative moving speed.

2. The gesture control method of claim 1, wherein the gesture is performed by keeping a palm of the hand at an initial distance from the face motionless within a time period, and the predetermined function is executed to set an initial reference position according to the initial distance.

3. The gesture control method of claim 1, wherein the gesture is performed by keeping a palm of the hand at an initial distance from the face and waving the palm within a time period, and the predetermined function is executed to set an initial reference position according to the initial distance.

4. The gesture control method of claim 1, wherein the gesture is performed by keeping a palm of the hand at an initial distance from the face, closing the hand within a time period and then opening the hand, and the predetermined function is executed to set an initial reference position according to the initial distance.

5. The gesture control method of claim 1, further comprising:

displaying a gesture corresponding object in the display screen when detecting the hand.

6. The gesture control method of claim 5, further comprising:
broadcasting a sound when detecting the hand.

7. The gesture control method of claim 1, wherein the gesture is performed by moving a palm of the hand to a distance with respect to the face, and the predetermined function is a turning function.

8. The gesture control method of claim 7, wherein the distance between the palm and the face is proportional to a turning speed of the turning function.

9. The gesture control method of claim 7, wherein there is a plurality of distance intervals defined between the palm and the face, a faster turning speed is generated when the palm moves to a farther distance interval with respect to the face, and a slower turning speed is generated when the palm moves to a closer distance interval with respect to the face.

10. The gesture control method of claim 7, further comprising:
identifying a position of the hand relative to the face;
the turning function being executed to turn toward a first direction when the hand is located at a first side of the face; and
the turning function being executed to turn toward a second direction when the hand is located at a second side of the face;
wherein the first side is opposite to the second side and the first direction is reversed to the second direction.

11. The gesture control method of claim 1, wherein the gesture is performed by waving a first of the hand with respect to the face, the predetermined function is a turning function, the gesture control method further comprises:
locking an object within the display screen when the hand changes from a palm to the fist; and
controlling the object to turn in a waving direction of the first when the first waves.

12. The gesture control method of claim 11, wherein a waving speed of the first is identical to a turning speed of the turning function.

13. The gesture control method of claim 11, further comprising:
identifying a position of the hand relative to the face;
the turning function being executed to turn toward a first direction when the hand is located at a first side of the face; and
the turning function being executed to turn toward a second direction when the hand is located at a second side of the face;
wherein the first side is opposite to the second side and the first direction is reversed to the second direction.

14. The gesture control method of claim 1, wherein the gesture is performed by waving a palm or a first of the hand, the predetermined function is a turning function, the gesture control method further comprises:
controlling an object within the display screen to turn in a waving direction of the palm or the first with a specific speed when the palm or the first waves with respect to the face with the specific speed.

15. The gesture control method of claim 14, wherein a waving speed of the palm or the first is proportional to a turning speed of the turning function.

16. The gesture control method of claim 14, further comprising:
identifying a position of the hand relative to the face;

the turning function being executed to turn toward a first direction when the hand is located at a first side of the face; and the turning function being executed to turn toward a second direction when the hand is located at a second side of the face;

wherein the first side is opposite to the second side and the first direction is reversed to the second direction.

17. The gesture control method of claim 1, wherein the gesture is performed by moving the hand forward and the predetermined function is a selecting function.

18. The gesture control method of claim 1, wherein the gesture is performed by moving the hand forward and backward and the predetermined function is a selecting function.

19. A gesture control device comprising:
a display unit for displaying a display screen;
an image capturing unit for capturing at least one image; and
a processing unit electrically connected to the image capturing unit and the display unit, the processing unit detecting whether there is a face in the at least one image; if there is a face in the at least one image, the processing unit detecting whether there is a hand in the at least one image; if there is a hand in the at least one image, the processing unit identifying a gesture performed by the hand and identifying a relative distance or a relative moving speed between the hand and the face; and the processing unit executing a predetermined function in the display screen according to the gesture and the relative distance or according to the gesture and the relative moving speed.

20. The gesture control device of claim 19, wherein the gesture is performed by keeping a palm of the hand at an initial distance from the face motionless within a time period, and the predetermined function is executed to set an initial reference position according to the initial distance.

21. The gesture control device of claim 19, wherein the gesture is performed by keeping a palm of the hand at an initial distance from the face and waving the palm within a time period, and the predetermined function is executed to set an initial reference position according to the initial distance.

22. The gesture control device of claim 19, wherein the gesture is performed by keeping a palm of the hand at an initial distance from the face, closing the hand within a time period and then opening the hand, and the predetermined function is executed to set an initial reference position according to the initial distance.

23. The gesture control device of claim 19, wherein the processing unit displays a gesture corresponding object in the display screen when detecting the hand.

24. The gesture control device of claim 23, further comprising a speaker electrically connected to the processing unit, wherein the processing controls the speaker to broadcast a sound when detecting the hand.

25. The gesture control device of claim 19, wherein the gesture is performed by moving a palm of the hand to a distance with respect to the face, and the predetermined function is a turning function.

26. The gesture control device of claim 25, wherein the distance between the palm and the face is proportional to a turning speed of the turning function.

27. The gesture control device of claim 25, wherein there is a plurality of distance intervals defined between the palm and the face, a faster turning speed is generated when the palm moves to a farther distance interval with respect to the face, and a slower turning speed is generated when the palm moves to a closer distance interval with respect to the face.

28. The gesture control device of claim 25, wherein the processing unit identifies a position of the hand relative to the face, the turning function is executed to turn toward a first direction when the hand is located at a first side of the face, the turning function is executed to turn toward a second direction when the hand is located at a second side of the face, the first side is opposite to the second side, and the first direction is reversed to the second direction.

29. The gesture control device of claim 19, wherein the gesture is performed by waving a first of the hand with respect to the face, the predetermined function is a turning function, the processing unit locks an object within the display screen when the hand changes from a palm to the first and controls the object to turn in a waving direction of the first when the first waves.

30. The gesture control device of claim 29, wherein a waving speed of the first is identical to a turning speed of the turning function.

31. The gesture control device of claim 29, wherein the processing unit identifies a position of the hand relative to the face, the turning function is executed to turn toward a first direction when the hand is located at a first side of the face, the turning function is executed to turn toward a second direction when the hand is located at a second side of the face, the first side is opposite to the second side, and the first direction is reversed to the second direction.

32. The gesture control device of claim 19, wherein the gesture is performed by waving a palm or a first of the hand, the predetermined function is a turning function, the processing unit controls an object within the display screen to turn in a waving direction of the palm or the first with a specific speed when the palm or the first waves with respect to the face with the specific speed.

33. The gesture control device of claim 32, wherein a waving speed of the palm or the first is proportional to a turning speed of the turning function.

34. The gesture control device of claim 32, wherein the processing unit identifies a position of the hand relative to the face, the turning function is executed to turn toward a first direction when the hand is located at a first side of the face, the turning function is executed to turn toward a second direction when the hand is located at a second side of the face, the first side is opposite to the second side, and the first direction is reversed to the second direction.

35. The gesture control device of claim 19, wherein the gesture is performed by moving the hand forward and the predetermined function is a selecting function.

36. The gesture control device of claim 19, wherein the gesture is performed by moving the hand forward and backward and the predetermined function is a selecting function.

* * * * *